(12) United States Patent
Christel et al.

(10) Patent No.: US 9,133,303 B2
(45) Date of Patent: Sep. 15, 2015

(54) METHOD FOR THE PRODUCTION POLYESTER WITH IMPROVED MELTING PROPERTIES AND CRYSTALLIZATION PROPERTIES

(75) Inventors: Andreas Christel, Zuzwil (CH); Allan Brent Culbert, Wil (CH)

(73) Assignee: POLYMETRIX AG, Oberbüren (CH)

( * ) Notice: Subject to any disclaimer, the term of this patent is extended or adjusted under 35 U.S.C. 154(b) by 144 days.

(21) Appl. No.: 11/886,818

(22) PCT Filed: Jan. 19, 2006

(86) PCT No.: PCT/CH2006/000043
§ 371 (c)(1),
(2), (4) Date: Sep. 21, 2007

(87) PCT Pub. No.: WO2006/099755
PCT Pub. Date: Sep. 28, 2006

(65) Prior Publication Data
US 2009/0082541 A1 Mar. 26, 2009

(30) Foreign Application Priority Data
Mar. 23, 2005 (DE) .......................... 10 2005 014 071

(51) Int. Cl.
*C08G 63/80* (2006.01)

(52) U.S. Cl.
CPC ..................................... *C08G 63/80* (2013.01)

(58) Field of Classification Search
CPC ..................................................... C08G 63/80
USPC .......... 528/271, 272, 301, 480; 422/131, 138, 422/198
See application file for complete search history.

(56) References Cited

U.S. PATENT DOCUMENTS

| | | | | |
|---|---|---|---|---|
| 4,064,112 A | * | 12/1977 | Rothe et al. | 528/272 |
| 5,540,868 A | * | 7/1996 | Stouffer et al. | 264/13 |
| 5,830,982 A | * | 11/1998 | Stouffer et al. | 528/308.3 |
| 2003/0069339 A1 | | 4/2003 | Takenaka | |

FOREIGN PATENT DOCUMENTS

| | | |
|---|---|---|
| DE | 139129 | * 12/1979 |
| WO | WO 97/21754 | 6/1997 |
| WO | WO 03/046044 | 6/2003 |
| WO | WO 2005/090437 | 9/2005 |

OTHER PUBLICATIONS

Englsih abstract of foreign document DD 139129.*
Translation of Schaaf et al patent DD139129.*
Karayannidis, G. P. et al, "Solid-State Polycondensation of Poly(ethylene terephthalate) Recycled From Postconsumer Soft-Drink Bottles. I"Dec. 20, 1993, Journal of Applied Polymer Science, John Wiley and SonsInc.,New York, US, pp. 2135-2142.
TH.Rieckmann and S. Völker, Polycondensation Processess and Polycondensation Plants, Modern Polyesters, pp. 88-99, 2003.

* cited by examiner

*Primary Examiner* — Frances Tischler
(74) *Attorney, Agent, or Firm* — Francis C. Hand; Carbella, Byrne, et al.

(57) ABSTRACT

The method for the production of a polyester with improved melting properties and crystallization properties comprises the steps of (a) production of a pre-polyester melt with an average molecular weight (Mn) of 2000 to 16000 g/mol, (b) solidifying and shaping the melt into pre-polyester particles, and (c) thermally treating the pre-polyester particles in a solid phase in the presence of a transesterification catalyst whereby a molecular weight increase (ΔMn) of more than 2000 g/mol occurs. In addition, the prepolyester particles have a carboxyl end group content (XCOOH) of between 0.25 and 0.6 before step c and during the thermal treatment step c, the proportion of the esterification reaction (E) to the polycondensation reaction (E+T) is between 0.5 and 1.

15 Claims, No Drawings

METHOD FOR THE PRODUCTION POLYESTER WITH IMPROVED MELTING PROPERTIES AND CRYSTALLIZATION PROPERTIES

The invention relates to a method for manufacturing polyester with improved melting properties and crystallization properties, wherein a pre-polyester melt is initially manufactured, then molded and solidified into pre-polyester particles, and thermally treated in a solid phase in the presence of a transesterification catalyst, wherein the pre-polyester particles exhibit a carboxyl end group content of between 25% and 60% prior to thermal treatment, and that esterification takes up between 50% and 100% of the polycondensation reaction.

The invention also relates to polyester, in particular to a polyethylene terephthalate, which is manufactured according to the described method.

The advantage to controlling a reaction for manufacturing polyester in a solid phase in such a way as give precedence to the esterification reaction over the transesterification reaction is that this makes it possible to manufacture polyester with a reduced melting point, reduced melting enthalpy, and hence improved melting properties. At the same time, the crystallization point is higher, which diminishes the formation of turbidity (haze) during the polyester cooling process. Both lead to a reduction in required processing energy overall.

The reaction is here controlled primarily through suitable starting conditions, and is supported by suitable process conditions, wherein sufficiently high reaction kinetics must be achieved to ensure the efficiency of polyester manufacture.

These correlations were previously unknown to prior art, since efforts to optimize solid-phase polycondensation were primarily limited to optimizing the reaction rate. For example, U.S. Pat. No. 4,205,157, Duh describes a process in which an optimal reaction rate is achieved if the starting conditions and process conditions of solid-phase polycondensation are selected in such a way that the transesterification reaction is preferred over the esterification reaction.

The initial product is polyester with an Mn of 3000 to 11500 g/mol, and a carboxyl end group content of less than 20%.

The only way known in prior art to control the reactions is to add reactive additives. However, the objective and approach are here different, and entail other disadvantages. This is why significantly less selectivity, and hence increasingly with undesirable side effects, e.g., molecule chains with branches, can be expected when using additives that react based on a polyaddition mechanism.

When using short-chained additives that react based on a polycondensation mechanism, the molecule chain structure as a whole is impeded.

For example, DE 19519898, Mrose et al. describes a method in which the rise in molecular weight inside a granulate only differs slightly from the rise in molecular weight outside a granulate, which is achieved by supplying low-molecular decomposition products from polycondensation reactions to the process gas. Polyester with a relatively low carboxyl end group content was selected as the initial product. While the polycondensation reaction correlation can be controlled in this way, an approaching equilibrium situation arises in the process, which has a negative effect on the development of the crystal structure (suppression of reaction while simultaneously continuing crystallization). Partially suppressing one of the polycondensation reactions also increases the time necessary to achieve a desired molecular weight.

Polyesters

Polyesters are crystallizable, thermoplastic polycondensates, e.g., polyethylene terephthalate (PET), polybutylene terephthalate (PBT) or polyethylene naphthalate (PEN), which are present either as homopolymers or as copolymers.

Polyester is polymer obtained from its monomers, a diol component and a dicarboxylic acid component. Various, mostly linear or cyclic diol components with 2 to 10 C.-atoms are used. In like manner, various, mostly aromatic dicarboxylic acid components usually having 1 to 3 aromatic rings can be used. Instead of dicarboxylic acid, its corresponding diester can be used, in particular dimethyl ester.

Polyesters are usually obtained in a polycondensation reaction with the separation of a low-molecular reaction product. In this case, polycondensation can take place directly between the monomers, or by way of an intermediate stage, which subsequently is converted through transesterification, wherein transesterification can again take place with the separation of a low-molecular reaction product, or via ring opening polymerization. The polyester obtained in this way is essentially linear, wherein a low number of branches can arise.

The polyester can be a new material or recycled material.

Additives can be incorporated into the polyester. Suitable additives include catalysts, dyes and pigments, UV blockers, processing aids, stabilizers, impact modifiers, chemical and physical foaming agents, fillers such as nucleating agents, particles that improve barrier or mechanical properties, reinforcing bodies, such as balls or fibers, along with reactive substances, e.g., oxygen absorbers or acetaldehyde absorbers.

Polyethylene Terephthalate

Polyethylene terephthalate (PET) is a type of polyester frequently used primarily for manufacturing blown containers, e.g., bottles.

The polyethylene terephthalate is obtained from its monomers, a diol component and a dicarboxylic component. The diol components here consist predominantly, in particular by more than 90 mol %, of ethylene glycol (1, 2 ethane diol), while the dicarboxylic component consists predominantly, in particular by more than 90 mol %, of terephthalic acid, wherein the total comonomer content usually lies between 1 and 15 mol %, in particular between 2 and 10 mol %. The comonomer content here corresponds to the sum of the diol comonomer content and the dicarboxylic acid comonomer content. The diol comonomer content is determined as the number of diol comonomer moles relative to the total number of diol moles. The dicarboxylic acid comonomer content is determined as the number of dicarboxylic comonomer moles relative to the total number of dicarboxylic acid moles.

Comonomers can also include other linear, cyclic or aromatic diol and dicarboxylic acid compounds. Typical comonomers are diethylene glycol (DEG), isophthalic acid (IPA) or 1,4-bis-hydroxymethyl-cyclohexane (CHDM).

Pre-Polyester Melt

A pre-polyester melt can be obtained either by melting open a solid pre-polyester, or through polymerization or polycondensation from the polyester monomer in the liquid phase. Possible pre-polymer melts include homopolyesters, copolyesters and mixtures of various polyesters, wherein recycled raw materials can be used.

Liquid-phase polymerization typically takes place at an elevated temperature, so that the prepolymer is obtained as a prepolymer melt.

Melting can take place in any melting apparatus desired, e.g., an extruder, wherein the polyester is here heated to a temperature exceeding its crystalline melting point. A reduction in molecular weight (depolymerization) can be achieved during or after the melting process.

The pre-polyester melt is usually manufactured via polycondensation in a liquid phase in a continuous process, wherein an esterification stage is followed by a pre-polycondensation stage. In the conventional polyester manufacturing process, a polycondensation stage in a high-viscosity reactor (also called finisher) follows. (For example, see: Modern Polyesters, Wiley Series in Polymer Science, Edited by John Scheirs, J. Wiley & Sons Ltd., 2003; Chapter 4.2). Polyester production can also take place in a batch process (For example, see: Modern Polyesters, Wiley Series in Polymer Science, Edited by John Scheirs, J. Wiley & Sons Ltd., 2003; Chapter 4.1).

The molecular weight of the pre-polyester, in particular a polyethylene terephthalate, then most preferably ranges between 10000 and 16000 g/mol, in particular measuring below 14000 g/mol.

As an alternative, the aforementioned polycondensation stage in a high-viscosity reactor can be omitted. This yields a low-viscous pre-polyester with a molecular weight lying clearly under the molecular weight of the polyester after an ensuing solid-phase treatment.

The molecular weight of the pre-polyester, in particular a polyethylene terephthalate, then most preferably ranges between 2000 and 10000 g/mol, in particular measuring over 4000 g/mol, most preferably over 7000 g/mol.

The molecular weight here denotes the average molecular weight (numerical average: Mn).

The viscosity of the polyester can either be indicated as intrinsic viscosity (IV) or average molecular weight (numerical average: Mn). The equation $$IV = k \ast Mn^a$$

was used to convert an IV value measured in phenol:dichloromethane=1:1 into the average molecular weight, wherein k=2.1 E-4 and a=0.82.

This equation can be generally applied to published data, if no other solution mixture and accompanying conversion factors are explicitly provided.

The IV value here denotes the solution viscosity, and is determined according to the following rule:

A mixture of phenol/dichlorobenzene (50:50% w/w) is used as the solvent for measuring the solution viscosity. The polyester sample is dissolved for 10 minutes at 130° C. with a concentration of 0.5% (0.5 g/dl). The relative viscosity (R.V.) is measured at 25° C. with a Ubbelohde viscometer (per DIN Instruction No. 53728, Part 3, January 1985).

The relative viscosity is the quotient comprised of the viscosity of the solution and the viscosity of the pure solvent, which can be compared with the ratio of the corresponding capillary flow rate. The Huggins equation is used to calculate the value for intrinsic viscosity form the measured relative viscosity:

$$I.V. = \frac{\sqrt{1 + 4K_H(R.V.-1)} - 1}{2 \ast c \ast K_H}$$

The above measurement methods (polymer concentration C=0.5 g/dl and the Huggins constant $K_H$=0.35) yield the equation:

$$I.V. = \frac{\sqrt{1 + 1.4(R.V.-1)} - 1}{0.35} \; (dl/g)$$

The end group concentration (EGN) can be calculated from the average molecular weight using the equation $$EGN = 2E6/Mn,$$

where Mn is used in g/mol, and results in EGN in mol/t.

The carboxyl end group concentration (CCOOH) and the end group concentration can be used to calculate the content of the individual end groups, wherein only the presence of hydroxyl and carboxyl end groups is taken into account for simplification purposes, so that $EGN = c_{COOH} + c_{OH}$.

Carboxyl end group content $X_{COOH} = c_{COOH}/EGN$; Hydroxyl end group content $X_{OH} = c_{OH}/EGN = (1 - X_{COOH})$
In this case, $c_{COOH}$ denotes the concentration of carboxyl end groups in mol/t, and $c_{OH}$ denotes the concentration of hydroxyl end groups in mol/t.

According to the invention, the quantities of diol components and dicarboxylic acid components along with the conditions in the pre-polyester manufacturing process are selected in such a way as to produce a pre-polyester with a carboxyl end group content of 0.25 to 0.6, in particular 0.3 to 0.55, wherein a carboxyl end group content exceeding 0.35, in particular exceeding 0.4, is preferred.

Granulation

The pre-polyester melt can be solidified and shaped into pre-polyester particles in any apparatus desired. However, care must be taken to essentially maintain the material properties and composition of the pre-polyester melt in the process, or bring them with in the range described in the invention.

Granulation methods are usually used.

During granulation, the prepolymer melt is placed into a defined mold and solidified. To this end, for example, the pre-polyester melt is pressed through a die with an opening (hole) or a plurality of openings, and then cut, dripped or atomized.

Cooling solidifies the pre-polyester melt. This can be accomplished using a liquid cooling medium (e.g., water, ethylene glycol) or gaseous cooling medium (e.g., air, nitrogen, water vapor), or through contact with a cold surface, with combinations of the cooling media also being conceivable.

Cooling can take place both simultaneously with, as well as before or after the process of shaping into particles.

The die openings are usually round, but can also have a different profile, e.g., slit-like openings. Care must be taken to keep the product flow quantity per die hole within narrow limits in terms of time and location, wherein the standard deviation of the individual product flow quantities is preferably held to between 0.1 and 10%. In order to achieve this, the diameter or length of a die hole can be varied, depending on its position. At the same time, the inflow conditions (pressure, rate, temperature, viscosity, etc.) for the individual die holes must be kept as uniform as possible.

Cutting can take place both directly at the die outlet, or even after completing a treatment run.

Given a pre-polyester melt with a molecular weight of over 7000 g/mol, use is made of granulation processes like extrusion granulation, water ring granulation, underwater granulation or head granulation (also hot-face granulation).

Given a more low-viscous pre-polyester melt, use is preferably made of granulation processes, such as dripping or atomizing.

Even though the term "water" is used in the designation of granulation arrangements, other fluids, fluid mixtures, liquids, liquid mixtures or liquids with dissolved, emulsified or suspended substances can also be employed.

While the granulation of polyesters with a molecular weight exceeding 15000 g/mol is used on an industrial scale, the granulation of low-viscose polyester melts is comparatively rare, but still known.

The use of a cutting device for manufacturing low-viscous pre-polyester particles is described in more detail in PCT/CH2005/000035, which is included in the present invention.

The use of a dripping device for manufacturing low-viscous pre-polyester particles is described in more detail in WO 04/055093, which is included in the present invention.

The average granulate size should range from 0.1 mm and 10 mm, preferably from 0.5 mm to 3 mm, and in particular from 0.85 mm to 2.5 mm. The statistical mean of the average granulate diameter resulting form the average of granulate height, length and width applies as the average granulate size. The granulate size distribution is to be kept within a narrow limit. The standard deviation for the granulate weights of 100 measured granulates most preferably ranges between 2 and 20%.

The granulates should most preferably have a defined granulate shape, e.g., be cylindrical, spherical, drop-shaped, sphere-like or have a designer shape of the kind proposed, for example, in EP 0541 674, Yau. While an irregular, grainy product shape of the kind obtained in a milling or crushing process is less preferred, it can also be used.

Most preferably used are massive granulates, i.e., no porous granulates of the kind obtained, for example, through sintering, foaming and the like.

Cooling can occur to a temperature lying below the glass transition temperature of the polyester, making it possible to store and/or transport the granulates over a longer period of time.

However, the average temperature of the pre-polyester granulates can also be kept at a higher level, in order to improve the energy efficiency of the process. To this end, it is possible to raise the temperature of the cooling medium and/or shorten the retention time in the cooling medium accordingly.

Solid-Phase Polycondensation

The molecular weight of the pre-polyester particles is increased via solid-phase polycondensation to a value of between 16,000 and 34,000 g/mol, in particular to a value of between 20,000 and 28,000 g/mol. According to the invention, the molecular weight rises by more than 2000 g/mol, in particular by more than 4000 g/mol.

Solid-phase polycondensation here involves the steps of crystallization (if still necessary after particle manufacture), preheating, post-condensation reaction, cooling as well as the provision and preparation of the necessary process gases. In this case, continuous and batch processes can be used, e.g., those that take place in apparatuses like fluidized bed, spouted bed and fixed bed reactors, as well as in reactors with impellers or self-moving reactors, such as rotary furnaces or tumble dryers. Solid-phase polycondensation can take place both at a standard pressure, an elevated pressure or under a vacuum.

Known in the art is the use of the highest possible post-condensation temperatures for achieving as short a post-condensation time as possible. However, the crystallinity is raised to a very high level in the process, which in turn leads to high processing temperatures. This is to be prevented by limiting the post-condensation temperature. In order to obtain sufficiently low processing temperatures, for example for a polyethylene terephthalate, it is advantageous for a significant segment of solid-phase polycondensation to take place at a temperature of under 230° C., preferably of under 220° C.

Reducing the post-condensation temperature yields longer post-condensation times for achieving the desired molecular weight, or even an asymptotic approximation to a molecular weight still lying below the desired molecular weight. Consequently, for example, it is advantageous for a polyethylene terephthalate if a significant segment of solid-phase polycondensation takes place at a temperature exceeding 190° C., preferably exceeding 200° C.

We know from prior art that the reaction rate in solid-phase polycondensation is at least partially diffusion-controlled, and hence increases with decreasing granulate size.

This yields an optimal post-condensation temperature range for each granulate size in which a desired molecular weight rise can be achieved in an economically justifiable post-condensation time measuring under 40 hours, ideally ranging between 4 and 30 hours. This optimal post-condensation temperature range should lie within the range described above for the maximum and minimum temperature during solid-phase polycondensation.

We also know that the crystallization rate reaches a maximum value at a temperature below the post-condensation temperature. Further, we know that the post-condensation rate decreases with increasing crystallinity. As a consequence, it is advantageous to heat at least partially crystalline polyester granulates quickly to obtain as quick a molecular weight rise as possible. A corresponding method is described in WO 02/068498, the text of which is also encompassed by this application.

In this case, it may be advantageous to briefly heat the pre-polyester particles to a temperature exceeding the aforementioned optimal post-condensation temperature range before solid-phase polycondensation begins. For example, polyethylene terephthalate can be heated and briefly kept at a temperature of between 220° C. and the crystalline melting point of the polyethylene terephthalate, preferably between 230° C. and 245° C. The retention time at the elevated temperature must here not exceed 2 hours, in particular not exceed 30 minutes.

In the polyester manufacturing process, catalysts are usually added to increase the reaction rate of polycondensation. In particular added transesterification catalysts remain active even during solid-phase polycondensation, thereby accelerating the transesterification reaction.

The transesterification catalysts are one or more substances based on metal elements, e.g., antimony, germanium, aluminum or titanium. The content of the metal element in the polyester usually ranges between 5 and 400 ppm, wherein preference goes to an antimony content of between 20 and 300 ppm, a germanium content of between 10 and 150 ppm, an aluminum content of between 10 and 200 ppm or a titanium content of between 5 and 20 ppm.

In one special embodiment of this invention, the polyester receives an esterification catalyst, e.g., a metal compound based on manganese, cobalt, zinc or calcium, to accelerate the esterification reaction. In many instances, such substances must be explicitly precluded, however, since these catalysts also promote undesirable side effects.

The invention is based on the knowledge that a polyester with improved melting properties and improved crystallization properties can be manufactured by selecting the initial properties of the pre-polyester and process conditions in solid-phase polycondensation in such a way as to increase the molecular weight predominantly via the esterification reaction.

The improved melting properties become evident from a comparatively low melting point and a comparatively low melting enthalpy, measured per DSC in the first run ($1^{st}$ run).

The improved crystallization properties become evident from a comparatively high crystallization point, measured per DSC in the second run ($2^{nd}$ run).

The polyester after solid-phase polycondensation is used for product characterization.

Two different types of properties can be determined by means of a differential scanning calorimetry (DSC) measurement:

1. The thermal properties, which result from product treatment, are determined in the first run of a DSC measurement. The DSC melting point and melting enthalpy here provide information about the conditions and energy levels required in a melting process to treat the polyester.
2. The thermal properties that result from product structure (chemical composition, molecular weight, molecular weight distribution) are determined in the second run of a DSC measurement. The DSC crystallization point here provides information about the conditions that lead to crystallization in a cooling process.

In order to determine the DSC melting points and DSC crystallization points, heating takes place to 310° C. at rate of 10° C./min in the first run. A retention time of one minute is followed by a cooling at maximum cooling rate. Heating to 310° C. at a rate of 10° C./min takes place again in the second run.

The DSC crystallization point corresponds to the temperature at which the exothermal crystallization peak is at its maximum.

The polyester should essentially exhibit a single crystallization peak.

The DSC crystallization peak in the second run of a polyethylene terephthalate homopolymer should exceed 145° C., for example, in particular 155° C. The crystallization point increases as a function of correlations known in prior art for polyethylene terephthalates with an elevated comonomer percentage.

The DSC melting point corresponds to the temperature at which the endothermal melting peak is at its maximum.

The polyester should essentially exhibit a single melting peak. In polyesters with a double peak or side peak (also called shoulder or covered shoulder) exceeding 5% of the primary peak, the peak at the higher temperature is taken into account. A shoulder or covered shoulder is manifested in an additional distinct stage or an additional maximum in the first derivation of the melting peak.

The DSC melting point in the first run of a polyethylene terephthalate homopolymer should measure less than 260° C., in particular less than 255° C., for example. In the case of polyethylene terephthalate with an increased share of comonomer, the melting point decreases based on the correlations known from prior art. The melting temperature of a standard polyethylene terephthalate depending on the comonomer content is described in EP 0532 988, Thiele, for example.

Melting enthalpy corresponds to the surface between the baseline and the melting point, limited by the left and right border of the peak, wherein a double peak or side peak is also taken into account. The melting enthalpy in the first run of a polyethylene terephthalate homopolymer should measure less than 75 J/g, in particular less than 70 J/g, for example. The melting enthalpy decreases as a function of the correlations known in prior art for polyethylene terephthalates with an elevated.

If the development of polyester end groups is measured before and after solid-phase polycondensation, the number of esterification reactions (E) and transesterification reactions (T) per ton of material can be determined.

$$E = c_{COOH}\text{Start} - c_{COOH}\text{end}$$

$$T = (c_{OH}^{Start} - c_{OH}^{End}) - E/2$$

The resulting percentages make it evident whether the reaction takes place predominantly by way of an esterification reaction $E/(E+T))>0.5$ or predominantly by way of a transesterification reaction $E/(E+T))<0.5$, wherein the invention preferably has more than 50%, in particular more than 65%, and especially preferably more than 80%, of the reaction taking place by way of an esterification reaction.

Thermal treatment in solid-phase polycondensation is essentially to take place in an inert atmosphere, in particular with the addition of an inert gas stream. Possible inert gases include nitrogen, $CO_2$ or inert gases, as well as mixtures of process gases.

The process gas is most preferably circulated. To reduce impairment to the polycondensation reaction, the process gas must be scrubbed to remove undesired products, in particular decomposition products from polycondensation reactions, such as water, ethylene glycol or short-chain aldehydes (e.g., acetaldehyde). Cleaning can take place using gas purification systems known in the art, e.g., catalytic burning systems, gas scrubbers, adsorption systems or cooling traps.

According to the invention, the polycondensation reaction is not to be controlled by adding low-molecular decomposition products to the polycondensation reaction.

Consequently, the water concentration in the inert gas must be kept low enough so as not to significantly impede the esterification reaction. The water concentration in the polyester while supplying the inert gas most preferably lies under 50%, in particular 30%, of the concentration that can theoretically be formed from the end groups of the polyester at its final molecular weight.

The concentration of low-molecular alkane diol decomposition products from the polycondensation reaction in the inert gas must also be kept low enough so as not to significantly impede the transesterification reaction. The alkane diol concentration in the polyester while supplying the inert gas preferably lies under 30%, in particular under 10%, of the concentration that can theoretically be formed from the end groups of the polyester at its final molecular weight.

The theoretical water concentration that can theoretically be formed from the end groups of the polyester at its final molecular weight is determined from the carboxyl end group concentration at the end of solid phase polycondensation ($c_{COOH}$ end)

$$c_{H2O}th = c_{COOH}\text{end}, \text{ when } c_{COOH}\text{end} <= c_{OH}\text{end}$$

If an excess carboxyl end group is present, the theoretical water concentration that can theoretically be formed from the end groups of the polyester at its final molecular weight is determined from the hydroxyl end group concentration at the end of solid phase polycondensation ($c_{OH}$ end).

$$c_{H2O}th = c_{OH}\text{end}, \text{ when } c_{COOH}\text{end} > c_{OH}\text{end}$$

The concentration of water supplied from outside with the inert gas relative to the polyester is determined from the quantity of water supplied per unit time $m°_{H2O}$ and the quantity of polyester to be processed per unit time $m°_{PET}$, wherein a division by the molecular weight of the water must take place to also obtain mol/t as the unit.

$$c_{H2O} = m°_{H2O}/m°_{PET}/Mw_{H2O}$$

The theoretical alkane diol concentration that can theoretically be formed from the end groups of the polyester at its final molecular weight is determined from the hydroxyl end group concentration at the end of solid-phase polycondensation ($c_{OH}$ end)

$$c_{AD}th = c_{OH}end/2$$

The concentration of alkane diol supplied from outside with the inert gas relative to the polyester is determined from the quantity of alkane diol supplied per unit time $m°_{AD}$ and the quantity of polyester to be processed per unit time $m°_{PET}$, wherein a division by the molecular weight of the alkane diol must take place to also obtain mol/t as the unit.

$$c_{AD} = m°_{AD}/Mw_{AD}/m°_{PET}$$

All concentrations are here obtained in mol/t.

During the manufacture of polyethylene terephthalate to be polycondensed to a molecular weight of 20,000 g/mol to 28,000 g/mol, the preferred process gas composition upon entry into the polycondensation reactor lies at an $H_2O$ content of less than 300 ppm (w), in particular less than 100 ppm (w), and at an inert gas content of less than 300 ppm (2), in particular less than 100 ppm (w), when working at a ratio of gas quantity to product quantity of less than 1.

EXAMPLE 1

A polyethylene terephthalate homopolymer melt with a diol component consisting of more than 97 mol % ethane diol and a dicarboxylic acid component consisting of more than 99% terephthalic acid, with a catalyst content of 480 ppm antimony, was formed into spherical granulates, solidified and cooled.

The granulates had an average diameter of between 2 and 3 mm.

The molecular weight measured Mn=4715 g/mol. The product had a carboxyl end group concentration of 166 mol/t, and hence a carboxyl end group content of 0.39.

The granulates were initially crystallized in a fluidized bed reactor for 20 minutes at 140° C., and then treated for 28.5 hours at 225° C. in a catalytically purified nitrogen stream having a dew point of under −40° C.

The treated product has a molecular weight Mn=22,675 g/mol, and a carboxyl end group concentration of 72 mol/t.

Hence, 55.8% of the polycondensation reaction involved esterification.

The DSC melting point as measured at a heating rate of 10°/min was 259.4° C.; the heat of fusion was 68.7 J/g.

COMPARATIVE EXAMPLE 1

Example 1 was repeated, but using an initial product with a lower carboxyl end group content of 0.29.

Only 44.5% of the polycondensation reaction here involved esterification.

The DSC melting point as measured at a heating rate of 10°/min was 264.1° C.; the heat of fusion was 69.5 J/g. The results are summarized on Table 1.

TABLE 1

|  | Example 1 | Comp. Example 1 |
|---|---|---|
| Mn start [g/mol] | 4715 | 4795 |
| EGN | 424 | 417 |
| $c_{COOH}$ start [mol/t] | 166 | 121 |
| % COOH start | 39.1 | 29.0 |

TABLE 1-continued

|  | Example 1 | Comp. Example 1 |
|---|---|---|
| T/t SSP [° C./h] | 225/28.5 | 225/24.5 |
| Mn end [g/mol] | 22675 | 23810 |
| $c_{COOH}$ end [mol/t] | 72.2 | 46.9 |
| Percentage esterification (E/(E + T)) | 55.8% | 44.5% |
| DSC melting point [° C.] | 259.4 | 264.1 |
| DSC heat of fusion [J/g] | 68.7 | 69.5 |
| DSC $2^{nd}$ run crystallization peak [° C.] | 172.5 | 169.0 |
| DSC $2^{nd}$ run melting point [° C.] | 255.3 | 254.4 |

EXAMPLE 2

A polyethylene terephthalate melt with a diol component consisting of more than 97 mol % ethane diol and a dicarboxylic acid component consisting of more than 99% terephthalic acid, with a catalyst content of 480 ppm antimony, was formed into spherical granulates, solidified and cooled.

The granulates had an average diameter of between 0.8 and 1 mm.

The molecular weight measured Mn=4955 g/mol. The product had a carboxyl end group concentration of 161 mol/t, and hence a carboxyl end group content of 0.40.

The granulates were initially crystallized in a fluidized bed reactor for 30 minutes at 140° C., and then treated for 28 hours at 215° C. in a pure nitrogen stream having a dew point of <−60° C.

The treated product has a molecular weight Mn=22,675 g/mol, and a carboxyl end group concentration of 42 mol/t.

Hence, 85% of the polycondensation reaction involved esterification.

The DSC melting point as measured at a heating rate of 10°/min was 253.2° C.; the heat of fusion was 70.2 J/g.

EXAMPLE 3

Example 2 was repeated, but using an initial product with a lower carboxyl end group, content of 0.29. The results are summarized on Table 2.

COMPARATIVE EXAMPLE 2

Example 2 was repeated, but using an initial product with a low carboxyl end group content of 0.08. The results are summarized on Table 2.

TABLE 2

|  | Example 2 | Example 3 | Comp. Ex. 2 |
|---|---|---|---|
| Mn start [g/mol] | 4955 | 4795 | 3245 |
| EGN | 404 | 417 | 616 |
| $c_{COOH}$ start [mol/t] | 161 | 121 | 46.2 |
| % COOH start | 39.9 | 29.0 | 7.5 |
| T/t SSP [° C./h] | 215/28 | 215/28 | 215/28 |
| Mn end [g/mol] | 17832 | 19023 | 12548 |
| $c_{COOH}$ end [mol/t] | 42.1 | 26.4 | 14.1 |
| Percentage esterification (E/(E + T)) | 85% | 60.6% | 14% |
| DSC melting point [° C.] | 253.2 | 254.6 | 257.1 |
| DSC heat of fusion [J/g] | 70.2 | 72.8 | 76.1 |
| DSC $2^{nd}$ run crystallization peak [° C.] | 164.2 | 159.2 | 149.9 |

The invention claimed is:

1. A method for manufacturing polyester with improved melting properties and crystallization properties, comprising the steps of:
   a. manufacturing a pre-polyester melt with an average molecular weight (Mn) of 10000 to 16000-g/mol and a transesterification catalyst, from a diol component and a dicarboxylic component having a total comonomer content between 1 and 15 mol %,
   b. solidifying and shaping said melt into pre-polyester particles,
   c. thermally treating said pre-polyester particles in a continuous process at a temperature of under 230° C. in a solid phase in the presence of said transesterification catalyst to effect a polycondensation reaction (E+T) to produce a polyester within a time period of between 4 and 30 hours, wherein a molecular weight increase ($\Delta$ Mn) to a value of the molecular weight between 16000 g/mol and 34000 g/mol takes place, wherein a molecular weight increase ($\Delta$ Mn) of more than 4000 g/mol takes place in step c and wherein the DSC melting enthalpy of the polyester lies below 75 J/g, characterized in that said pre-polyester particles exhibit a carboxyl end group content ($X_{COOH}$) of between 0.25 and 0.6 before step c, and that an esterification reaction (E) makes up between 0.5 and 1 of the polycondensation reaction (E+T) during treatment in step c.

2. The method according to claim 1, characterized in that the molecular weight increases to a value (Mn) of between 20,000 and 28,000 g/mol in step c.

3. The method according to claim 1, characterized in that said pre-polyester particles exhibit a carboxyl end group content ($X_{COOH}$) of between 0.30 and 0.55 before step c.

4. The method according to claim 1, characterized in that said pre-polyester particles exhibit a carboxyl end group content ($X_{COOH}$) of greater than 0.40 to 0.6 before step c.

5. The method according to claim 1, characterized in that said esterification reaction (E) makes up more than 0.8 of said polycondensation reaction (E+T) during thermal treatment in step c.

6. The method according to claim 1, characterized in that said transesterification catalyst consists of at least one substance based on metal elements selected from the group consisting of antimony, germanium, aluminum and titanium, and the content of the metal element in the polyester ranges between 5 and 400 ppm, wherein an antimony content is between 20 and 300 ppm, a germanium content is between 10 and 150 ppm, an aluminum content is between 10 and 200 ppm and a titanium content is between 5 and 20 ppm.

7. The method according to claim 1, characterized in that said particles are granulates having a defined shape.

8. The method according to claim 1, characterized in that said polyester is one of polyethylene terephthalate or a copolymer of polyethylene terephthalate.

9. The method according to claim 8 characterized in that said thermal treatment in step c. takes place at a temperature ranging between 190° C. and 220° C.

10. The method according to claim 8, further characterized in that heating to an elevated temperature of between 230° C. and 245° C. takes place at the beginning of said thermal treatment step and wherein the retention time in this elevated temperature range measures 30 minutes.

11. The method according to claim 8, characterized in that said thermal treatment in step c. takes place in an inert gas atmosphere.

12. The method according to claim 11, characterized in that the water concentration in the inert gas atmosphere is held low enough that its concentration in the polyester while supplying the inert gas lies under 30%.

13. The method according to claim 11, characterized in that the concentration of low-molecular alkane diol decomposition products from the polycondensation reaction in the inert gas is held low enough that its concentration in the polyester during while supplying the inert gas lies under 30% of the concentration that can theoretically be formed from the end groups of the polyester at its end molecular weight.

14. The method according to claim 1, characterized in that an esterification catalyst is added in step c for accelerating the esterification reaction.

15. The method according to claim 1 characterized in that the DSC crystallization peak temperature in a second run of the polyester exceeds 155° C.

* * * * *